(12) United States Patent
van Druten et al.

(10) Patent No.: US 9,664,280 B2
(45) Date of Patent: May 30, 2017

(54) DRIVELINE FOR A VEHICLE

(71) Applicant: DTI Group, BV, Eindhoven (NL)

(72) Inventors: Roëll Marie van Druten, Eindhoven (NL); Bas Gerard Vroemen, Eindhoven (NL); Alexander Franciscus Anita Serrarens, Waalre (NL)

(73) Assignee: DTI Group B.V., Eindhoven (NL)

( * ) Notice: Subject to any disclaimer, the term of this patent is extended or adjusted under 35 U.S.C. 154(b) by 0 days.

(21) Appl. No.: 14/427,196

(22) PCT Filed: Sep. 10, 2013

(86) PCT No.: PCT/NL2013/050654
§ 371 (c)(1),
(2) Date: Mar. 10, 2015

(87) PCT Pub. No.: WO2014/038945
PCT Pub. Date: Mar. 13, 2014

(65) Prior Publication Data
US 2015/0247574 A1    Sep. 3, 2015

(30) Foreign Application Priority Data

Sep. 10, 2012  (NL) ..................................... 2009440
Sep. 11, 2012  (NL) ..................................... 2009441

(51) Int. Cl.
*F16H 37/08*     (2006.01)
*F16H 63/34*     (2006.01)
*F16H 63/18*     (2006.01)

(52) U.S. Cl.
CPC ..... *F16H 63/3408* (2013.01); *F16H 37/0826* (2013.01); *F16H 63/18* (2013.01);
(Continued)

(58) Field of Classification Search
None
See application file for complete search history.

(56) References Cited

U.S. PATENT DOCUMENTS 3,691,861 A * 9/1972 Sturmer .................. F16H 3/006
74/330
4,846,010 A * 7/1989 Fujikawa ........... B60K 17/3467
180/249

(Continued)

FOREIGN PATENT DOCUMENTS

| CN | 100 429 436 | 10/2008 |
|---|---|---|
| CN | 101889156 A | 11/2010 |

(Continued)

*Primary Examiner* — Dirk Wright
(74) *Attorney, Agent, or Firm* — Banner & Witcoff, Ltd.

(57) ABSTRACT

A driveline 1 comprises a transmission 7 having an input shaft 9 and an output shaft 13 as well as an end drive 19 connected to the output shaft of the transmission, which end drive includes a differential 21. The transmission comprises a plurality of switchable gear trains as well as a shift drum 23 which has three cam profiles 25, 27, 29 and three shift forks S01, S23, S4X provided with cam followers for moving a clutch element for coupling a gear to a shaft present in the transmission.
The shift drum 23 further includes a further cam profile 31 and the transmission comprises a further cam follower F4 as well as a locking element which is connected via a gear unit 35 to the further cam follower and locks a driving element 37 in the driveline so that drive shafts connected to the differential are locked against rotation.

11 Claims, 4 Drawing Sheets

(52) U.S. Cl.
  CPC . *F16H 63/3416* (2013.01); *F16H 2200/0056* (2013.01); *F16H 2200/2005* (2013.01); *F16H 2200/2033* (2013.01); *Y10T 74/19279* (2015.01)

(56) References Cited

U.S. PATENT DOCUMENTS

| | | | | |
|---|---|---|---|---|
| 5,181,893 | A | * | 1/1993 | Ashikawa .............. B60K 17/08 475/203 |
| 5,395,293 | A | * | 3/1995 | Matsuura .............. B60W 10/08 477/15 |
| 5,966,990 | A | * | 10/1999 | Fuchs .................... F16H 3/093 74/337.5 |
| 7,487,691 | B2 | * | 2/2009 | Kapp ...................... F16H 61/32 74/337.5 |
| 2010/0313707 | A1 | | 12/2010 | Akashi |

FOREIGN PATENT DOCUMENTS

| | | |
|---|---|---|
| CN | 102287527 A | 12/2011 |
| DE | 195 28 460 | 10/1996 |
| EP | 2275 719 | 1/2011 |
| WO | WO 2011/133033 | 10/2011 |

\* cited by examiner

DRIVELINE FOR A VEHICLE

CROSS-REFERENCE TO RELATED APPLICATIONS

This application for a utility patent is a National application of a previously filed PCT application, currently pending, having the application number PCT/NL2013/050654 filed Sep. 10, 2013, which further claims priority to Netherlands National application number NL2009440, filed Sep. 10, 2012, and Netherlands National application number NL2009441, filed Sep. 11, 2012.

FIELD OF THE INVENTION

The invention relates to a driveline for a vehicle comprising a transmission which has an input shaft and an output shaft and an end drive connected to the output shaft of the transmission which end drive includes a differential, which transmission comprises at least two switchable gear trains as well as a shift drum provided with at least a cam profile and a shift fork provided with a cam follower for moving a clutch element for coupling a gear to a shaft present in the transmission. This shaft present in the transmission may be the input shaft or the output shaft or a lay shaft.

The cam profile may be formed for example by a peripheral groove in the drum wall with a circular cylindrical bottom and two parallel side walls which form the cam profile and between which the cam follower is enclosed in axial direction.

STATE OF THE ART

A driveline of this type is generally known and is particularly intended for use in a vehicle. The transmission of the known driveline is provided with a mechanism that locks the output of the driveline against rotation when the vehicle is parked and the driveline is in the parking position. This to avoid undesired rolling off.

SUMMARY OF THE INVENTION

It is an object of the invention to provide a driveline of the type defined in the opening paragraph with which, when used in a vehicle, a simple and cost-effective way of avoiding rolling off of the vehicle when in parking position may be obtained. For this purpose the driveline according to the invention is characterized in that the shift drum is further provided with a further cam profile and the transmission comprises a further cam follower, as well as a locking element (parking lock) which is connected via a gear set mechanism to the further cam follower and which locks a driving element in the driveline, so that at least a single drive shaft connected to the differential is locked against rotation. By utilizing the shift drum, already incorporated in the transmission, for locking the output of the driveline, no separate additional actuator is needed for this.

A preferred embodiment of the driveline according to the invention is characterized in that the further cam profile is formed by a side wall of a recess which extends over at least part of the circumference of the shift drum in the outside of the wall of the shift drum, which recess extends in axial direction as far as an outer end of the shift drum. The further cam profile may also be considered to be the axial bounding wall of a recess present in the axial end face of the shift drum over at least part of the circumference. In this embodiment the further cam follower is kept in contact with the side wall of the recess preferably by means of a spring. This spring presses the cam follower against the side wall of the recess so that this cam follower actually follows the profile of the cam.

In order to maintain a simple and cost effective transmission, the transmission preferably comprises only a single shift drum. This shift drum preferably has three cam profiles, in which said cam profile is included, and three shift forks provided with cam followers, in which said shift fork with cam follower is included.

In order to avoid vibrations and sound generation as much as possible, the shift drum is preferably made of plastic.

The transmission provided with the inventive shift drum further preferably comprises a further input shaft, where between the further input shaft and the output shaft a first switchable gear set and a first gearing are present, and between the input shaft and the output shaft a second switchable gear set and a second gearing are present, and the driveline preferably further includes a clutch having a first clutch section and a second clutch section which is connected to the input shaft of the transmission, as well as planetary gear set comprising at least three rotational members of which a first rotational member is connected to the first clutch section, a second rotational member is connected to the further input shaft, and a third rotational member is connected to a brake, while the first and second rotational members can be directly engaged into each other by means of the clutch and a further clutch connected in series to this clutch without the insertion of a further gear set.

The further clutch in the transmission is preferably located between the input shaft and the further input shaft. Furthermore, the further clutch is capable of directly coupling to each other preferably the input shaft and the further input shaft of the transmission without the insertion of a further gear set.

Between the input shaft and the output shaft of the transmission are further located preferably a third gear set and a third gearing. If so desired a further pair consisting of a gear set and a gearing may be present so as to be able to realize extra transmission ratios in the transmission without an additional cam profile.

Furthermore, preferably located between one of the input shafts and the output shaft of the transmission there is a reverse gear and a fourth gearing. This reverse gear does not reverse the direction of rotation between this input shaft and the output shaft of the transmission, whereas the other gear sets present in the transmission do reverse this direction of rotation.

BRIEF DESCRIPTION OF THE DRAWINGS

The invention will be further described below in more detail with reference to examples of embodiment of the driveline according to the invention and represented in the drawing figures, in which.

DETAILED DESCRIPTION OF THE DRAWINGS

Figure 1:
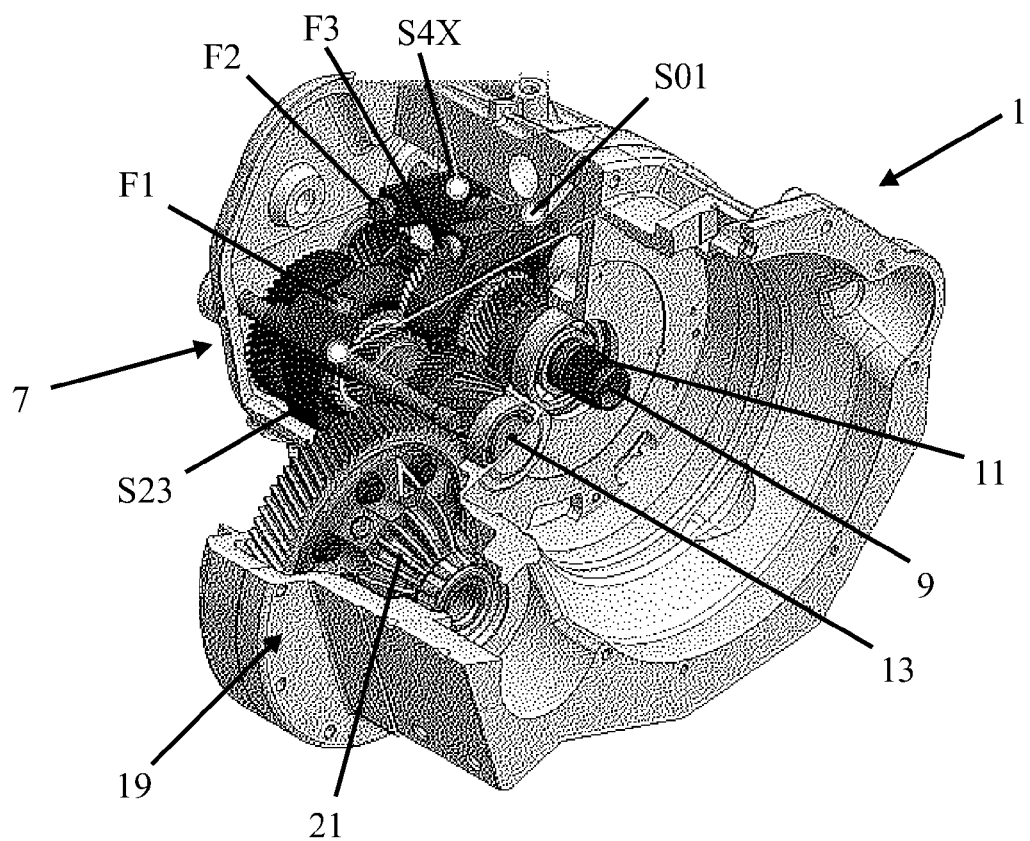
FIG. 1 shows an exploded view of the housing of the driveline containing the transmission and the end drive but not including shift drum, clutch and planetary gear set.
Figure 2:
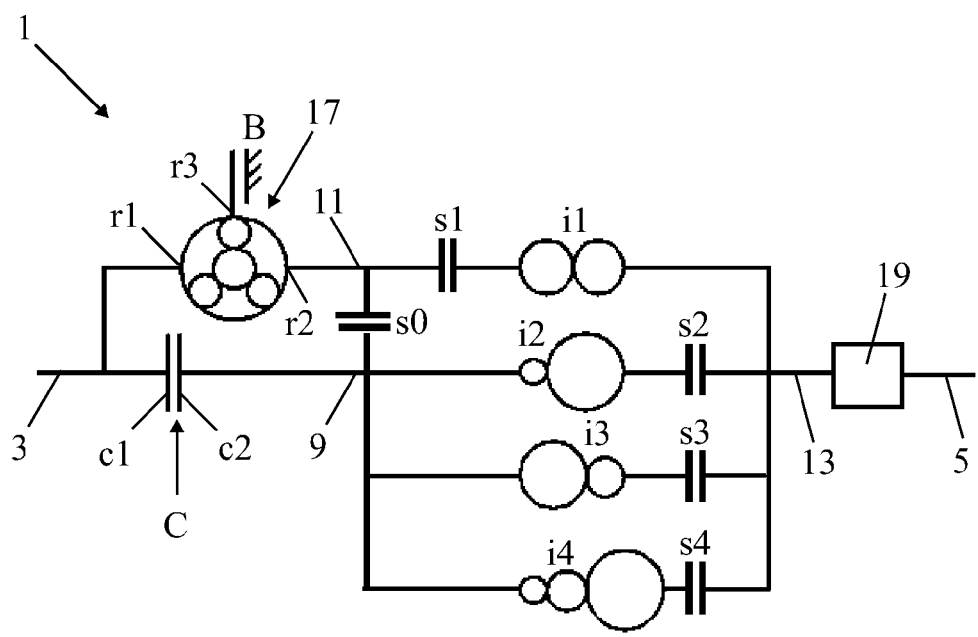
FIG. 2 gives a diagrammatic representation of the layout of the driveline.

FIG. 1 shows in a perspective view an embodiment of the driveline according to the invention with a half-exploded view of the housing. For clarity's sake the shift drum, clutch and planetary gear set of the driveline have been omitted. FIG. 2 shows the layout of the driveline. The driveline 1 has an input 3 and an output 5 (see FIG. 2), and comprises a transmission 7 having an input shaft 9, a further input shaft 11 and an output shaft 13. The driveline further includes a clutch C which has a first clutch section c1 that is connected to the input 3 and a second clutch section c2 that is connected to the input shaft 9 of the transmission 7. The driveline also includes a planetary gear set 17 which comprises at least three rotational members, a first rotational member r1 of which is connected to the first clutch section c1, a second rotational member r2 of which is connected to the further input shaft 11 of the transmission 7, and a third rotational member r3 of which is connected to a brake B.

Between the further input shaft 11 and the output shaft 13 are located a first switchable gear set i1 and a first gearing s1, and between the input shaft 9 and the output shaft 13 are located a second switchable gear set i2 and a second gearing s2, as well as a third gear set i3 and a third gearing s3, and a reverse gear i4 and a fourth gearing s4. This reverse gear does not reverse the direction of rotation between this input shaft and output shaft of the transmission.

The transmission 7 further includes a further clutch s0 which is located between the input shaft 9 and the further input shaft 11, and which can directly couple the input shaft 9 and the further input shaft 11 of the transmission 7 to each other, without the insertion of a further gear set. As a result, also the first and second rotational member r1 and r2 can be directly engaged into each other by means of the clutch C and the further clutch c0 connected in series to this clutch, without the insertion of a further gear set.

Furthermore, the driveline 1 comprises an end drive 19 connected to the output shaft 13 of the transmission which end drive includes a differential 21 (see FIG. 1). The input shaft 9 is formed by a central solid shaft and the further input shaft 11 is formed by a hollow shaft which surrounds the input shaft 9.

Figure 3:
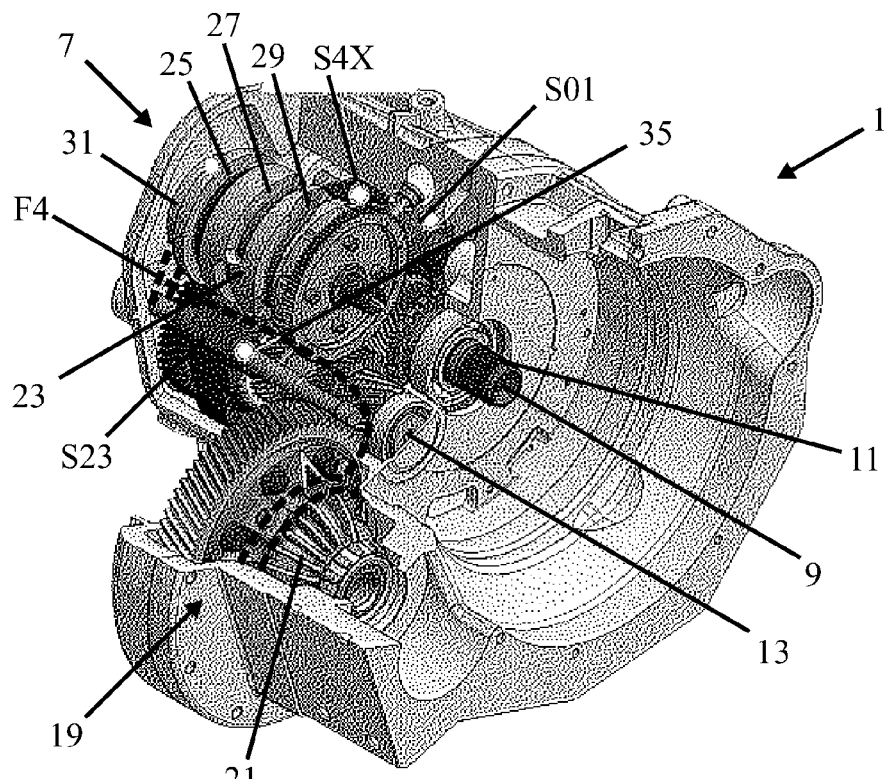
FIG. 3 shows the driveline shown in FIG. 1 including a shift drum.
Figure 4:
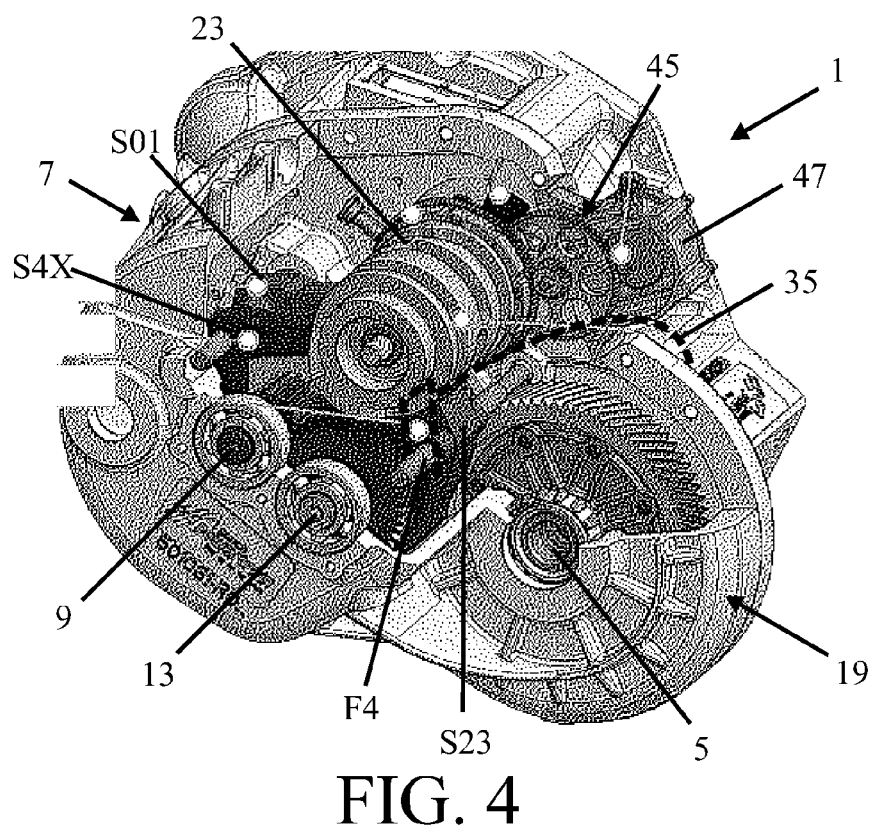
FIG. 4 shows the driveline shown in FIG. 3 seen from another angle.

The transmission 7 further includes a shift drum 23 (see FIGS. 3 and 4 in which the driveline is shown in a perspective view seen from two different angles). The shift drum is made of plastic and has three cam profiles 25, 27 and 29 which are formed by peripheral grooves in the drum wall 23B. These grooves have a circular cylindrical bottom and two parallel side walls which form the cam profile and between which cam followers F1, F2, F3 (see FIG. 1) are enclosed in axial direction. These cam followers are found on shift forks S01, S23 and S4X for moving clutch elements for coupling a gear of the gear sets and the reverse gear to the shaft on which this gear is located. This may be the input shaft or the output shaft.

Figure 5:
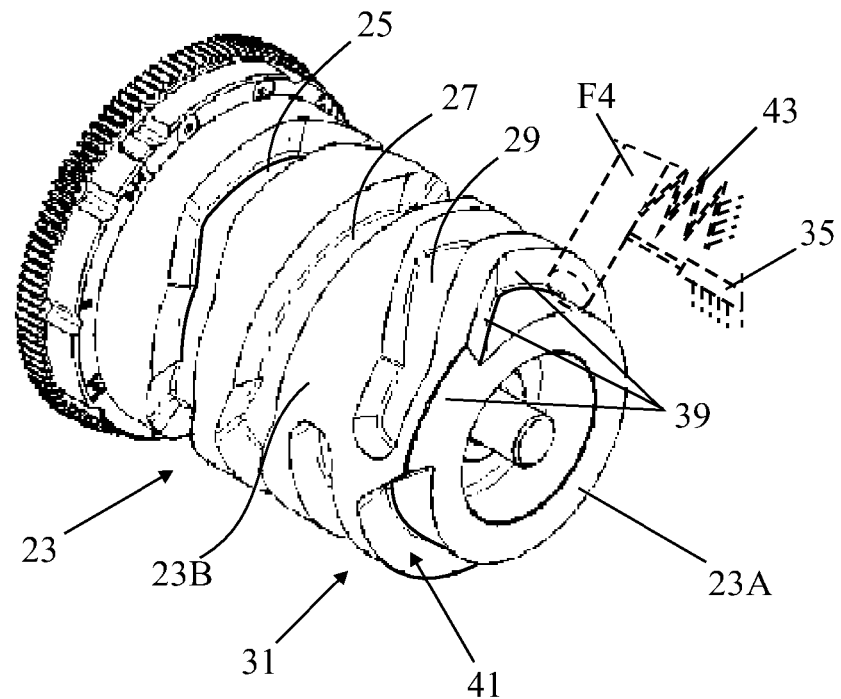
FIG. 5 shows a detailed view of the shift drum of the transmission;"
Figure 6:
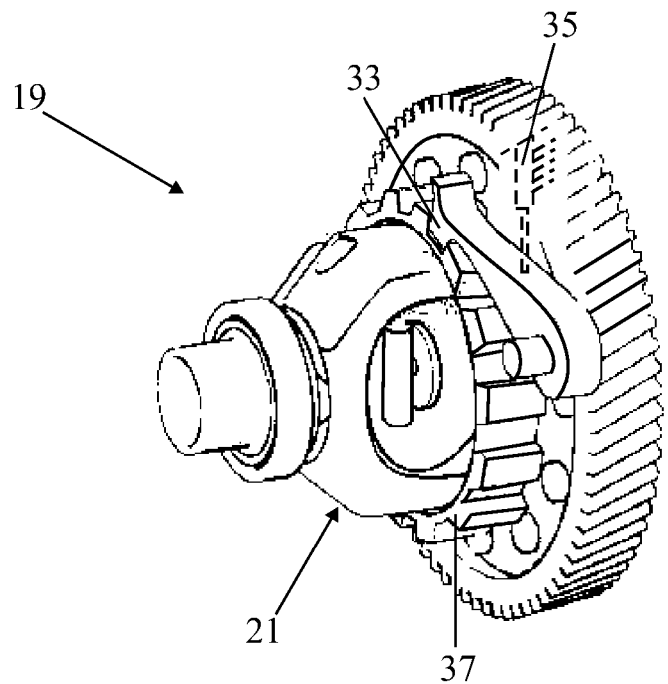
FIG. 6 shows a detailed view of the end drive with parking brake.

The shift drum 23 is further provided with a further cam profile 31 (see FIG. 5), which cooperates with a further cam follower F4 (whose position is indicated by means of a broken line) which is present in the transmission. This further cam follower is connected to a locking element 33 via a force-transmitting mechanism 35 (Bowden cable). This locking element 33 locks a driving element 37 in the driveline. In this embodiment this driving element is a toothed ring which is fitted to the differential 21 of the driveline (see FIG. 6) so that the drive shafts (not shown) connected to the differential are locked against rotation.

The further cam profile 31 is formed by a side wall 39 of a recess 41 in the outside 23B of the wall of the shift drum (see FIG. 5), which recess extends over part of the periphery of the shift drum 23. This recess extends in axial direction as far as an outer end 23A of the shift drum. This further cam profile may also be seen as a peripheral groove provided in the drum and which is bounded only on one side by a side wall and is open on the other side. The further cam follower F4 is pressed against the side wall 39 by a spring 43.

The shift drum 23 is driven by an electromotor 47 via a gear train 45 (see FIG. 4).

Figure 7:
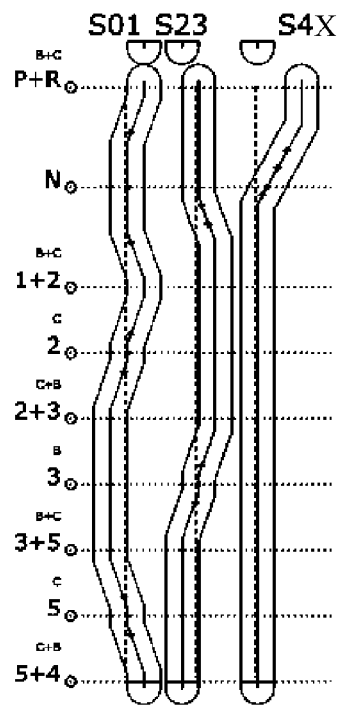
FIG. 7 shows an example of a groove pattern in the shift drum.

FIG. 7 shows the groove pattern in the shift drum spread out in a plane, showing above the grooves the shift forks cooperating with these grooves, and to the left of this the gears that are engaged in the various positions of the shift drum. The shift fork S01 operates the gearings s0 and s1, the shift fork S23 operates the gearings s2 and s3, and the shift fork S4X operates the gearing s4 which can engage the reverse gear i4.

Figure 8:
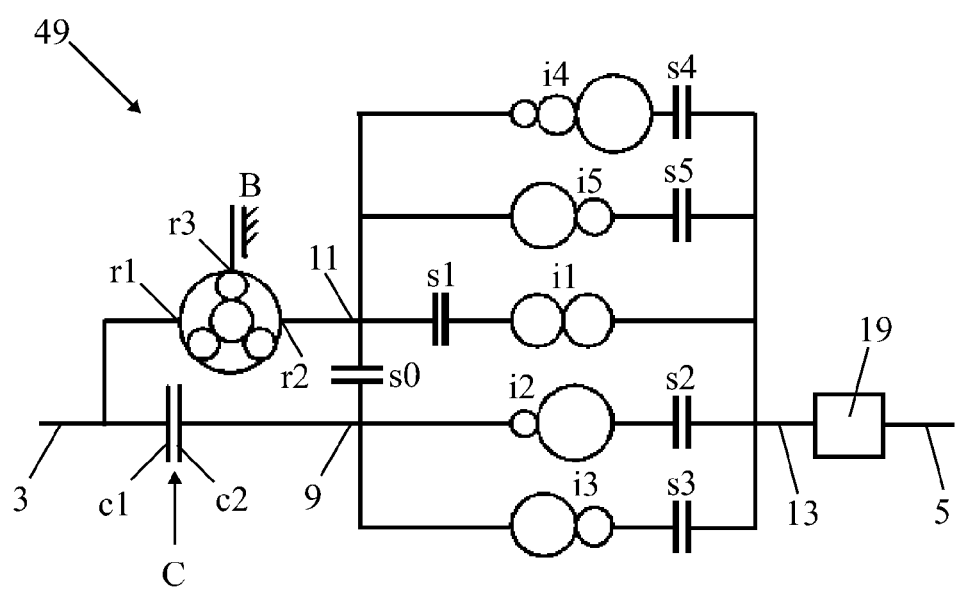
FIG. 8 shows a schematic diagram of the layout of a further embodiment of the driveline according to the invention.

The transmission may additionally comprise a fifth gear set i5 and a fifth gearing s5 which can also be operated by the shift fork S4X. FIG. 8 shows the layout of a further embodiment of the driveline according to the invention which is provided with this fifth gear set. By means of this driveline 49 it is possible to realize seven forward gears and a reverse gear.

Albeit the invention has been described in the foregoing with reference to the drawing Figures, it should be pointed out that the invention is not by any manner or means restricted to the embodiments shown in the drawing Figures. The invention also extends over any embodiments deviating from the embodiments shown in the drawing Figures within the scope defined by the claims.

The invention claimed is:

1. A driveline for a vehicle, the driveline comprising:
   a transmission which has an input shaft and an output shaft and an end drive connected to the output shaft of the transmission;
   wherein the end drive includes a differential;
   at least two switchable gear trains as well as a shift drum provided with at least a cam profile and a shift fork provided with a cam follower for moving a clutch element for coupling a gear to a shaft present in the transmission;
   wherein the shift drum is further provided with a further cam profile and the transmission comprises a further cam follower, as well as a locking element which is connected via a gear set mechanism to the further cam follower and which locks a driving element in the driveline, so that at least a single drive shaft connected to the differential is locked against rotation.

2. The driveline as claimed in claim 1, wherein the further cam profile is formed by a side wall of a recess which extends over at least part of the circumference of the shift drum in the outside of the wall of the shift drum, which recess extends in axial direction as far as an outer end of the shift drum.

3. The driveline as claimed in claim 2, wherein the further cam follower is kept in contact with the side wall of the recess by means of a spring.

4. The driveline of claim 1, wherein the transmission comprises only a single shift drum.

5. The driveline of claim 1, wherein the shift drum has three cam profiles in which said cam profile is included, and the transmission comprises three shift forks provided with cam followers in which said shift fork with cam follower is included.

6. The driveline of claim 1, wherein the shift drum is made of plastic.

7. The driveline of claim 1, wherein the transmission further comprises a further input shaft, where between the further input shaft and the output shaft a first switchable gear set and a first gearing are present, and between the input shaft and the output shaft a second switchable gear set and a second gearing are present, and which driveline further includes a clutch having a first clutch section and a second clutch section which is connected to the input shaft, as well as planetary gear set comprising at least three rotational members of which a first rotational member is connected to the first clutch section, a second rotational member is connected to the further input shaft, and a third rotational member is connected to a brake, while the first and second rotational members can be directly engaged into each other by means of the clutch and a further clutch connected in series to this clutch without the insertion of a further gear set.

8. The driveline of claim 7, wherein the further clutch in the transmission is located between the input shaft and the further input shaft.

9. The driveline of claim 7, wherein the further clutch is capable of directly coupling the input shaft and the further input shaft of the transmission to each other, without the insertion of a further gear set.

10. The driveline of claim 7, wherein between the input shaft and the output shaft of the transmission are further located a third gear set and a third gearing.

11. The driveline of claim 7, wherein located between one of the input shafts and the output shaft of the transmission there is a reverse gear and a fourth gearing, which reverse gear does not reverse the direction of rotation between this input shaft and the output shaft of the transmission.

\* \* \* \* \*